United States Patent
Nilsson

(10) Patent No.: US 11,002,336 B2
(45) Date of Patent: May 11, 2021

(54) TORSIONAL DAMPER

(71) Applicant: Volvo Truck Corporation, Gothenburg (SE)

(72) Inventor: Ola Nilsson, Varberg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/049,007

(22) PCT Filed: Apr. 20, 2018

(86) PCT No.: PCT/EP2018/060233
§ 371 (c)(1),
(2) Date: Oct. 19, 2020

(87) PCT Pub. No.: WO2019/201453
PCT Pub. Date: Oct. 24, 2019

(65) Prior Publication Data
US 2021/0088105 A1 Mar. 25, 2021

(51) Int. Cl.
*F16F 15/129* (2006.01)
*F16F 15/131* (2006.01)
(Continued)

(52) U.S. Cl.
CPC ...... *F16F 15/129* (2013.01); *F16F 15/13142* (2013.01); *F16D 2300/22* (2013.01);
(Continued)

(58) Field of Classification Search
CPC .... F16F 15/1238; F16F 15/139; F16F 15/129; F16F 15/13142; F16F 2230/24
See application file for complete search history.

(56) References Cited

U.S. PATENT DOCUMENTS 5,579,880 A * 12/1996 Feldhaus ............... F16F 15/129
192/214
5,655,967 A * 8/1997 Lopez ................... F16F 15/129
464/68.92
(Continued)

FOREIGN PATENT DOCUMENTS

| DE | 102012215868 A1 | 3/2014 |
| DE | 102014015542 A1 | 4/2016 |
| WO | 2016/000733 A1 | 1/2016 |

OTHER PUBLICATIONS

PCT/EP2018/060233 International Search Report and Written Opinion dated Jan. 30, 2019, 8 pages.

*Primary Examiner* — Vishal R Sahni
(74) *Attorney, Agent, or Firm* — Withrow & Terranova PLLC

(57) ABSTRACT

The invention relates to a torsional damper (210) in a clutch disc arrangement (200) arranged to indicate damping performance of the torsional damper (210). The torsional damper (210) comprises a driven plate (211), an output hub (212), intermediate friction plates (213) arranged on either side of the driven plate (211) and a resilient member (214) arranged to press the intermediate friction plates (213) against the driven plate (211) or against the output hub (212) with a pressure force. The intermediate friction plates (213) and the resilient member (214) are rotationally fixed to the output hub (212) or the driven plate (211) forming a rotationally fixed stack (213, 214, 212; 213, 214, 211). The rotationally fixed stack (213, 214, 212; 213, 214, 211) comprises a detection friction plate (215) rotatably decoupled from the rotationally fixed stack (213, 214, 212; 213, 214, 211) and arranged in the rotationally fixed stack (213, 214, 212; 213, 214, 211).

19 Claims, 11 Drawing Sheets

(51) Int. Cl.
*F16F 15/139* (2006.01)
*F16F 15/123* (2006.01)

(52) U.S. Cl.
CPC ......... *F16F 15/1238* (2013.01); *F16F 15/139* (2013.01); *F16F 2230/24* (2013.01)

(56) References Cited

U.S. PATENT DOCUMENTS 5,673,778 A * 10/1997 Ament .................. F16F 15/129
                                                        192/213.12
8,935,041 B2    1/2015 Hagel et al.
2012/0115619 A1* 5/2012 Takenaka .............. F16F 15/129
                                                        464/45

* cited by examiner

TORSIONAL DAMPER

This application is a 35 USC 371 national phase filing of International Application No. PCT/EP2018/060233, filed Apr. 20, 2018, the disclosure of which is incorporated herein by reference in its entirety.

TECHNICAL FIELD

The invention relates to a torsional damper in a clutch disc arrangement for indicating damping performance of the torsional damper. The intermediate friction plates and the resilient member are rotationally fixed to the output hub or the driven plate forming a rotationally fixed stack.

The invention can be applied in clutches and powertrains of all kinds of vehicles, for example heavy-duty vehicles such as trucks, buses and construction equipment as well as lighter vehicles such as cars.

BACKGROUND

Ignition-induced irregularities in rotational speed of a crankshaft generate torsional vibrations in the powertrain of vehicles driven by an internal combustion engine. The vibrations in the powertrain in turn cause disturbing noises in the vehicle body and rattling in the transmission. To reduce these torsional vibrations, it is common to provide a clutch disc arrangement with coil springs that allows a limited degree of rotation between the crankshaft and the transmission input shaft. However, at the resonance frequency of the powertrain, the torsional vibrations are amplified rather than attenuated by the coil springs. Therefore, it is known to supplement the coil springs with a torsional damper in the hub of the clutch disc arrangement. The torsional damper comprises a driven plate arranged to transform rotational movement from the crankshaft to the transmission input shaft when the driven plate is engaged in the clutch. The driven plate is connected to an output hub connected to the transmission input shaft. The driven plate is connected to the output hub via intermediate friction plates arranged on either side of the driven plate. The torsional damper comprises a resilient member arranged between the output hub and the intermediate friction plates to apply pressure on the intermediate friction plates such that the intermediate friction plates are pressed against the driven plate. The torsional damper effectively reduces the vibrations at the resonance frequency by means of friction between the driven plate and the intermediate friction plates. However, as the surfaces of intermediate friction plates wear, the damping performance is reduced. This is usually not detected until the driver of the vehicle is disturbed by noise caused by the vibrations or during a regular service. At that stage, the vibrations might already have caused unnecessary wear or damage to the clutch disc arrangement and to the gearbox.

There is thus a need for a method removing the above mentioned disadvantage.

SUMMARY

An object of the invention is to provide an inventive arrangement for detecting damping performance of a torsional damper in a clutch disc arrangement. The object is achieved by an arrangement according to claim 1.

The invention relates to a torsional damper in a clutch disc arrangement arranged to indicate damping performance of the torsional damper. The torsional damper comprises a driven plate, an output hub, intermediate friction plates on either side of the driven plate and a resilient member arranged to press the intermediate friction plates against the driven plate or against the output hub with a pressure force. The intermediate friction plates and the resilient member are rotationally fixed to the output hub or the driven plate forming a rotationally fixed stack. The rotationally fixed stack comprises a detection friction plate rotatably decoupled from the rotationally fixed stack and arranged in the rotationally fixed stack.

One advantage of the invention is that the detection friction plate can be arranged in the rotationally fixed stack with a pre-determined friction factor such that movement or possible movement of the detection friction plate is an indication that the pressure force from the resilient member is below a pre-determined value which indicates a faulty torsional damper. The pre-determined friction factor is dependent on the pressure force from the resilient member and the surface characteristics of the detection friction plate and the surfaces that the detection friction plate bears against.

The driven plate is arranged to transform rotational movement from a crankshaft, i.e. a propulsion unit output shaft of an engine, to a gearbox shaft, i.e. a transmission input shaft, when the driven plate is engaged in the clutch. The driven plate comprises an outer friction surface arranged to be frictionally engaged with a counterpart being directly or indirectly attached to or part of the crankshaft. The driven plate is connected to the output hub which in turn is connected to the transmission input shaft. The driven plate is rotationally balanced around a centre axis coinciding with the centre axis of the gearbox shaft. The driven plate is advantageously disc shaped with two opposing sides extending in the radial direction. The opposing sides can be flat or may have a curvature. The output hub comprises a first side portion and a second side portion extending in a radial direction. The driven plate, the intermediate friction plates, the resilient member and the detection friction plate are positioned between the first side portion and the second side portion. The first side portion and the second side portion are directly or indirectly attached to or part of the gearbox shaft/transmission input shaft. The radial direction is perpendicular to the centre axis.

The rotationally fixed stack is restricted from movement in the rotational direction coinciding with the rotational direction of the driven plate and the output hub. The rotationally fixed stack is however not fully restricted from movement in an axial direction being perpendicular to the rotational direction. The possibility to move the rotationally fixed stack in the axial direction allows for the resilient member to directly or indirectly exert pressure on the intermediate friction plates such that they can exert pressure onto the driven plate or the output hub depending on arrangement embodiment. It should be noted that the rotationally fixed stack is allowed movement in the axial direction only for predetermined distance depending on e.g. design and available space. Further advantages and advantageous features of the invention are disclosed in the following description and in the dependent claims.

According to one embodiment, the intermediate friction plates and the resilient member are rotationally fixed to the output hub forming the rotationally fixed stack. The intermediate friction plates are arranged to press against the driven plate that is arranged to rotate relative the intermediate friction plates. Here, rotate relates to the small rotational movement allowed in clockwise and anti-clockwise direction within the torsional damper. The output hub comprises guiding means and the intermediate friction plates comprises corresponding guiding means for allowing axial movement of the intermediate friction plates relative the output hub. The guiding means can be any suitable guiding means, for example an opening in the output hub a corresponding protrusion in the intermediate friction plates, or vice versa.

When the intermediate friction plates and the resilient member are rotationally fixed to the output hub, the driven plate is connected to the output hub via intermediate friction plates arranged on either side of the driven plate, i.e. at least one intermediate friction plate on one side and at least another intermediate friction plate on the other side of the driven plate, and the driven plate comprises an inner friction surface on each side of the driven plate. The outer friction surface of the driven plate is arranged radially outward with respect to the inner friction surface. Here, outward refers to a direction starting from the centre axis. The resilient member is arranged between the first or second side portion of the output hub and one of the intermediate friction plates to apply pressure on the intermediate friction plates such that the intermediate friction plates are pressed against the driven plate. According to one example, the resilient member comprises two resilient units, wherein one resilient unit is arranged between the first side portion of the output hub and one of the intermediate friction plates, and wherein one resilient unit being arranged between the second side portion of the output hub and one of the intermediate friction plates, to apply pressure on the intermediate friction plates such that the intermediate friction plates are pressed against the driven plate.

When the intermediate friction plates and the resilient member are rotationally fixed to the output hub, the detection friction plate can be positioned at various positions. According to one example embodiment, the detection friction plate is arranged between the output hub and an intermediate friction plate. According to one example embodiment, the detection friction plate is arranged between two intermediate friction plates with the previously stated example advantage. According to one example embodiment, the detection friction plate is arranged between the resilient member and an intermediate friction plate. According to one example embodiment, the detection friction plate is arranged between the resilient member and the output hub. When the detection friction plate is arranged in connection to the resilient member, the previously stated example advantage applies also here but a further advantage is that the detection friction plate can be used to identify whether the resilient member has got stuck to the detection friction plate. Due to vibrations and high pressure, it is known a problem where the resilient member wears down the surface against which it is arranged, which has the consequence of less pressure against the intermediate friction plates and thus a faulty torsional damper. As stated before, the movement or possible movement of the detection friction plate is an indication that the pressure force from the resilient member is below a pre-determined value which indicates a faulty torsional damper, but when the detection friction plate is immobilized it is an indication that the detection friction plate is stuck to the resilient member.

According to one embodiment, the intermediate friction plates and the resilient member are rotationally fixed to the driven plate and the intermediate friction plates are arranged to press against the output hub that is arranged to rotate relative the friction plates. Here, rotate relates to the small rotational movement allowed in clockwise and anti-clockwise direction within the torsional damper. The driven plate comprises guiding means and the intermediate friction plates comprises corresponding guiding means for allowing axial movement of the intermediate friction plates relative the driven plate. The guiding means can be any suitable guiding means, for example an opening in the driven plate and a corresponding protrusion in the intermediate friction plates, or vice versa.

When the intermediate friction plates and the resilient member are rotationally fixed to the driven plate, the driven plate is connected to the output hub via intermediate friction plates arranged on either side of the driven plate, i.e. at least one intermediate friction plate on one side and at least another intermediate friction plate on the other side of the driven plate. The output hub comprises an inner friction surface on an inner side of the first side portion of the output hub and an inner friction surface on an inner side of the second side portion. Here, inner side refers to a side facing the driven plate. The outer friction surface of the driven plate is arranged radially outward with respect to the inner friction surfaces of the output hub. The resilient member is arranged between the driven plate and one of the intermediate friction plates to apply pressure on the intermediate friction plates such that the intermediate friction plates are pressed against the output hub. According to one example, the resilient member comprises two resilient units. One resilient unit being arranged in connection to one of the opposing sides of the driven plate and between the opposing side and one intermediate friction plate, wherein the other resilient unit being arranged in connection to the other of the opposing sides of the driven plate and between the opposing side and one intermediate friction plate.

When the intermediate friction plates and the resilient member are rotationally fixed to the driven plate forming the rotationally fixed stack and the intermediate friction plates are arranged to press against the output hub, the detection friction plate can be positioned at various positions. According to one example, the detection friction plate is arranged between the driven plate and an intermediate friction plate. According to one example, the detection friction plate is arranged between two intermediate friction plates. According to one example the detection friction plate is arranged between the resilient member and an intermediate friction plate. According to one example, the detection friction plate is arranged between the resilient member and the driven plate. When the detection friction plate is arranged in connection to the resilient member, the previously stated example advantage applies also here but a further advantage is that the detection friction plate can be used to identify whether the resilient member has got stuck to the detection friction plate. Due to vibrations and high pressure, it is known a problem where the resilient member wears down the surface against which it is arranged, which has the consequence of less pressure against the intermediate friction plates and thus a faulty torsional damper. As stated before, the movement or possible movement of the detection friction plate is an indication that the pressure force from the resilient member is below a pre-determined value which indicates a faulty torsional damper, but when the detection friction plate is immobilized it is an indication that the detection friction plate is stuck to the resilient member.

As stated above, the detection friction plate is arranged in the rotationally fixed stack such that it is subject to pressure, directly or indirectly, from the resilient member and since the detection friction plate is rotatably decoupled from the rotationally fixed stack, rotation of the detection friction plate is advantageously used as indication of the state of the resilient member and consequently the damping performance of the torsional damper.

According to one example embodiment, the torsional damper comprises a pre-loaded unit connected to the detection friction plate. The pre-loaded unit is loaded with a predetermined force that rotates the detection friction plate when the pressure force is below a predetermined value. It should be noted that the pressure force together with the friction between the detection friction plate and the surfaces that the detection friction plate bears against determine the friction force that needs to be overcome in order to move the detection friction plate with relation to the rotationally fixed stack. Hence, by determining a threshold level for the pressure force, below which threshold level the detection friction plate can be rotated/moved, the pre-loaded unit can be loaded with a predetermined force corresponding to the torque needed to rotate the detection friction plate. One advantage of the embodiment is that the pre-loaded unit automatically rotates/moves the detection friction plate when the pressure force from the resilient member is below the threshold level, which allows for an easy detection of the damping performance of the torsional damper.

According to an example embodiment with the above described advantage, the pre-loaded unit is a pre-tensioned spring connected to the detection friction plate and the rotationally fixed stack or a unit attached to a part of the rotationally fixed stack or a unit fixedly arranged in connection to the rotationally fixed stack. Here, the unit attached to a part of the rotationally fixed stack or a unit fixedly arranged in connection to the rotationally fixed stack can be any part of the torsional damper to which the rotationally fixed stack is attached, all depending on design.

According to one example embodiment, the detection friction plate comprises connection means for enabling rotation of the detection friction plate by an external force that rotates the detection friction plate when the pressure force (friction force) is below a predetermined value. The connection means can be any suitable connection means that allows for a device to connect to the detection friction plate, for example an opening, indentation, through opening, protrusion, clamping means, etc. The device comprises corresponding connection means that can connect to the connection means of the detection friction plate such that a force can be applied to the detection friction plate for rotation/movement of the same. The device can be a torque apparatus, for example a torque wrench, set to release at a predetermined torque corresponding to a pressure force of the resilient member being at or above a predetermined threshold level. A pressure force value of the resilient member below the predetermined threshold level would allow for movement of the detection friction plate by use of a torque below the predetermined torque indicating a faulty torsional damper. Hence, should the torque wrench rotate the detection friction plate with a torque below the predetermined torque for release, it would be an indication that the pressure force value is below the threshold level. The torque apparatus can be an automatic/automated device connected to the detection friction plate for evaluation or can be a man held device for manual evaluation. An advantage of the embodiment is an easy process for evaluation and it allows for both automatic/automated and manual evaluation. As stated before, the movement or possible movement of the detection friction plate is an indication that the pressure force from the resilient member is below a pre-determined value which indicates a faulty torsional damper, but when the detection friction plate is immobilized it could be an indication that the detection friction plate is stuck to the resilient member. Here, the torque apparatus can be used to indicate immobilisation when a predetermined torque value is exceeded without movement of the detection friction plate.

According to one example embodiment, the detection friction plate comprises a detection mark indicating rotation of the detection friction plate with relation to the rotationally fixed stack. The detection mark can be used in any one of the above described embodiments, for example together with the pre-loaded unit and the torque device. One exemplary advantage with the detection mark is that it enables an easy and visual detection of movement of the detection friction plate relative a fixed mark. The detection mark can be one or more visual indicators applied to the detection friction plate. According to one example, the detection mark is part of the detection friction plate structure, for example a notch or protrusion. According to one example, the detection mark is attached to the detection friction plate, for example painted or glued. The fixed mark can be one or more visual indicators on the fixed stack or unit onto which the fixed stack is attached. According to one example, the fixed mark is part of the fixed stack or unit structure, for example a notch, through opening or protrusion. According to one example, the fixed mark is attached to the fixed stack or unit, for example painted or glued. One exemplary advantage with a plurality of detection marks is that it is possible to identify a progress of movement of the detection friction plate should different detection marks represent different distance the detection friction plate has moved. In this example, different detection marks have different position and could have different colours and/or shape.

With reference to the above described embodiments and examples, the torsional damper comprises a coil spring arrangement connecting the driven plate and the output hub and configured to enable a limited degree of rotation, clockwise and anti-clockwise, between the driven plate and output hub.

It should be noted that all of the above described embodiments and examples relates to a torsional damper in a clutch disc arrangement that could be arranged to connect and disconnect the crankshaft of the engine to the gearbox shaft. Hence, the invention relates to a clutch disc arrangement and a powertrain comprising a torsional damper according to the above and a vehicle comprising such torsional damper and clutch disc arrangement.

Further advantages and advantageous features of the invention are disclosed in the following description and in the dependent claims.

The terminology used herein is for the purpose of describing particular examples only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The foregoing has described the principles and exemplary embodiments of realizing the invention. However, the invention should be regarded as illustrative rather than restrictive, and not as being limited to the particular examples discussed above. The different features of the various examples of the invention can be combined in other combinations than those explicitly described. It should therefore be appreciated that variations may be made in those examples by those skilled in the art without departing from the scope of the invention as defined by the following claims.

BRIEF DESCRIPTION OF THE DRAWINGS

With reference to the appended drawings, below follows a more detailed description of embodiments of the invention cited as examples.

In the drawings:

FIG. 10 schematically shows a cross-section of a clutch disc arrangement comprising a torsional damper according to one example of the invention, and wherein;

DETAILED DESCRIPTION OF EXAMPLE EMBODIMENTS OF THE INVENTION

With reference to FIGS. 1-11, the invention relates to a torsional damper 210 in a clutch disc arrangement 200 for indicating damping performance of the torsional damper 210 in the clutch disc arrangement 200.

Figure 1:
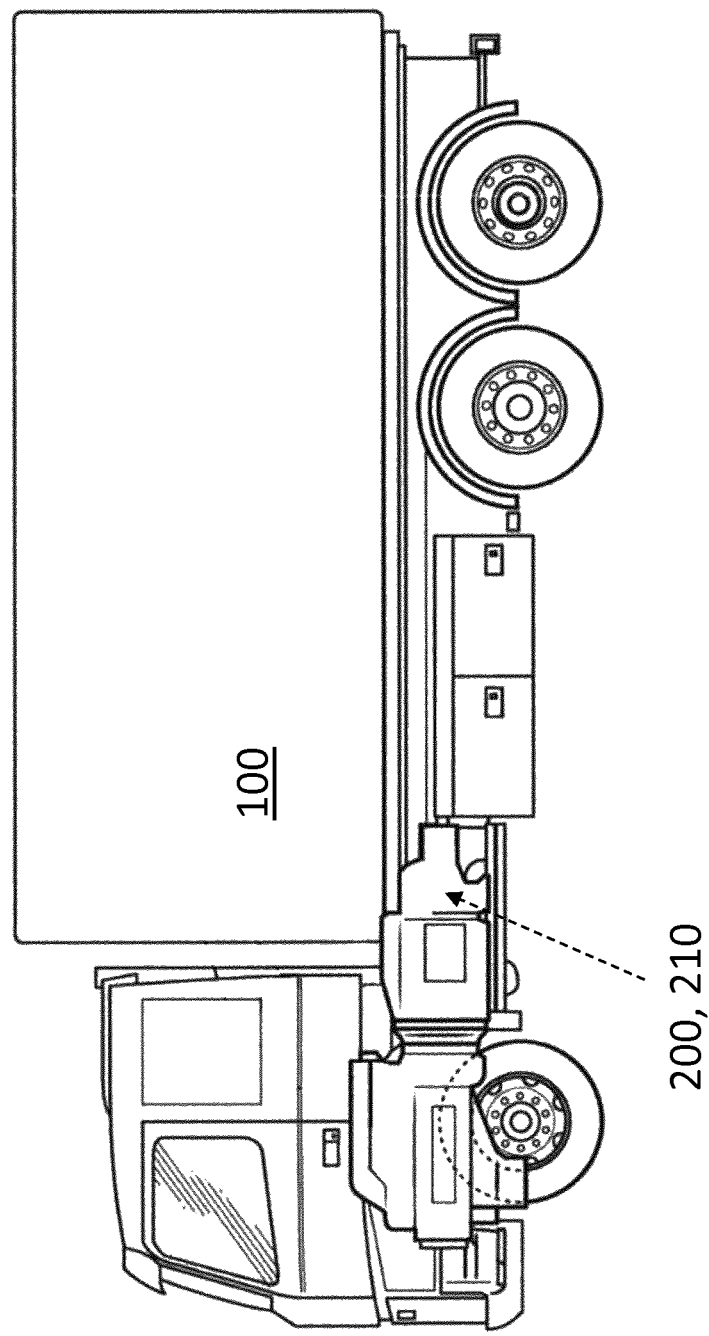
FIG. 1 schematically shows a side view of a vehicle comprising a torsional damper in a clutch disc arrangement according to the invention.

FIG. 1 schematically shows a side view of a vehicle 100 comprising the torsional damper 210 in the clutch disc arrangement 200 according to the invention.

Figure 2:
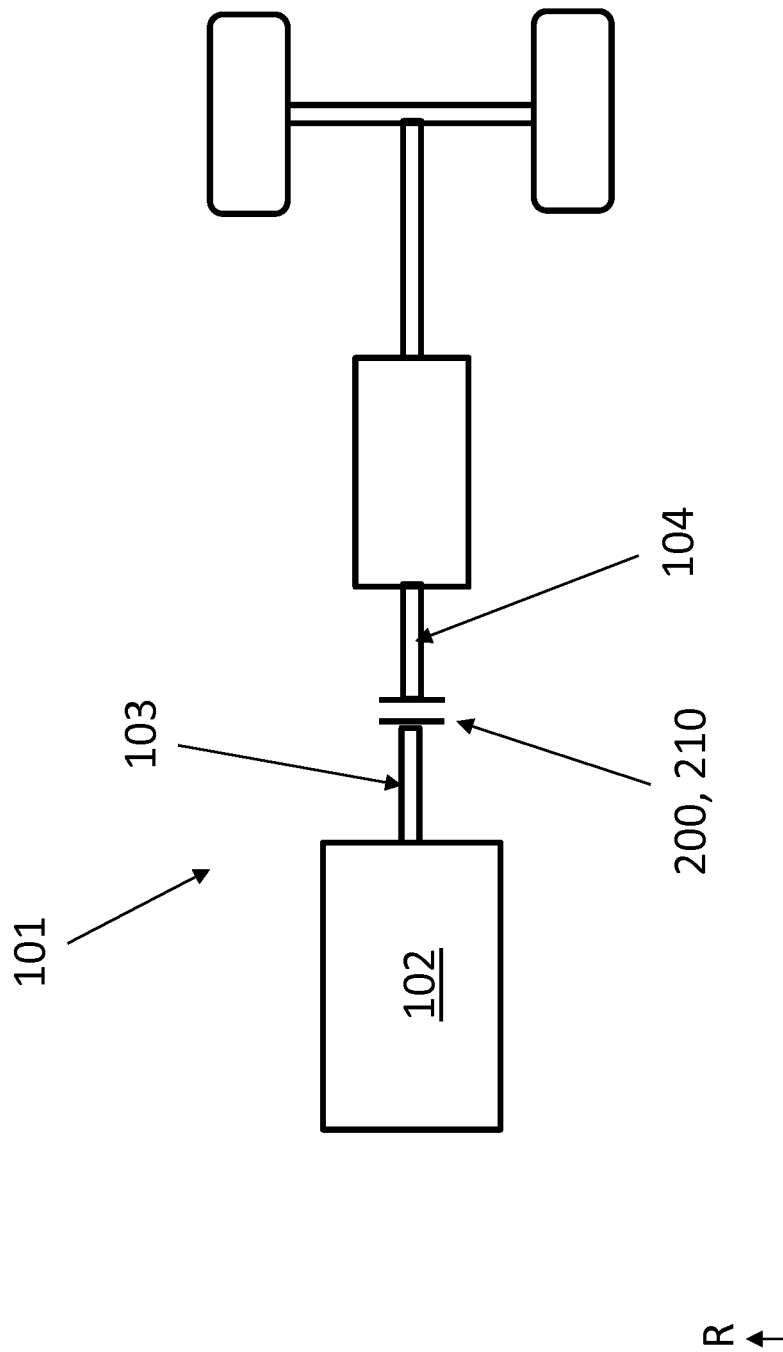
FIG. 2 schematically shows a top view of a powertrain comprising a torsional damper in a clutch disc arrangement according to the invention.

FIG. 2 schematically shows a top view of a powertrain 101 comprising a torsional damper 210 in a clutch disc arrangement 200 according to the invention. The torsional damper 210 and clutch disc arrangement 200 is arranged to connect and disconnect a crankshaft 103, i.e. a propulsion unit output shaft, of an engine 102 to a gearbox shaft 104, i.e. a transmission input shaft. Hence, the invention relates also to a clutch disc arrangement 200 comprising a torsional damper 210 and a vehicle comprising such torsional damper 210 and clutch disc arrangement 200 as shown in FIG. 1.

Figure 3:
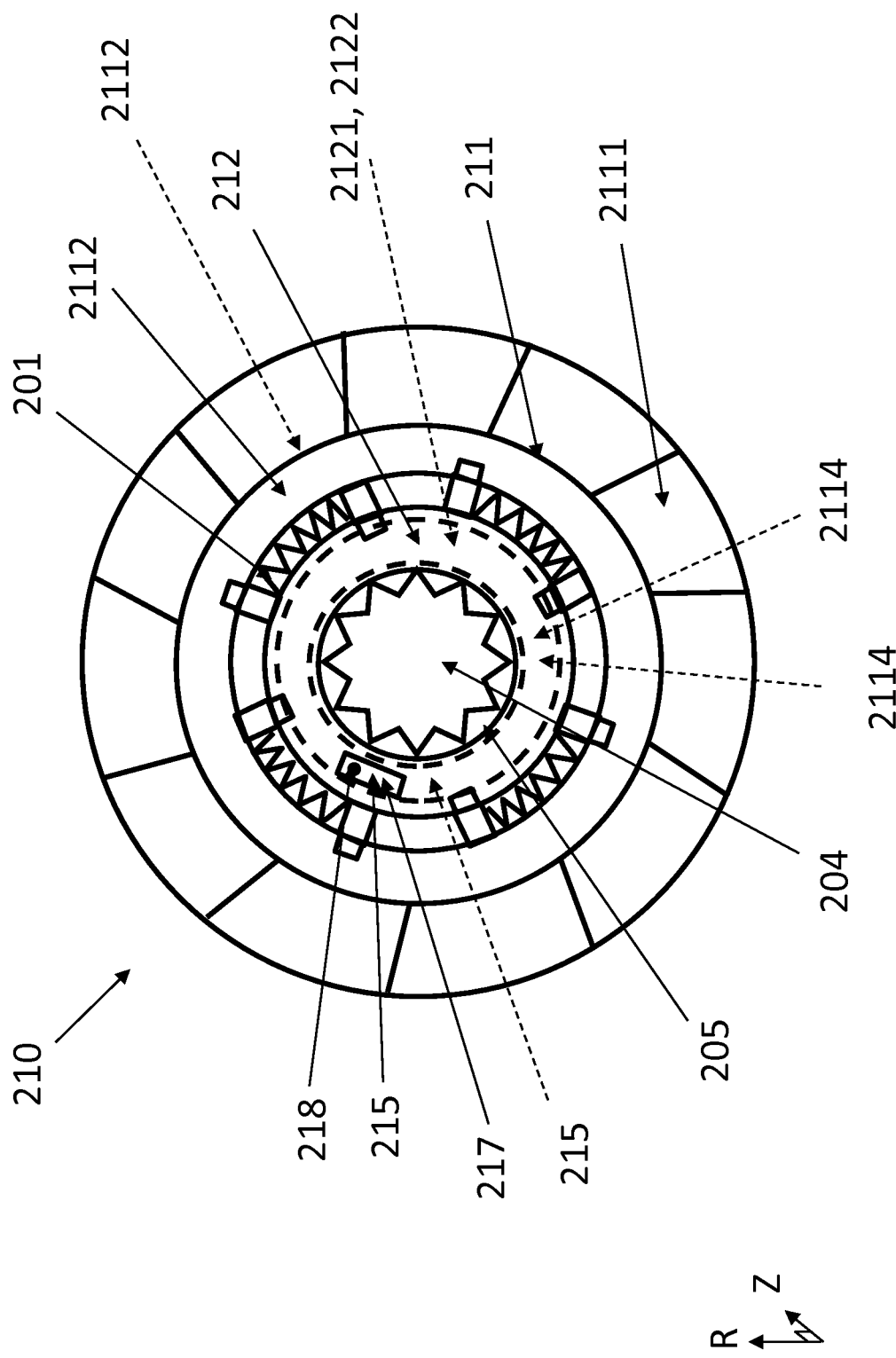
FIG. 3 schematically shows a perspective view of a torsional damper in a clutch disc arrangement, shown in any of FIGS. 5-11, according to one example of the invention.
Figure 4:
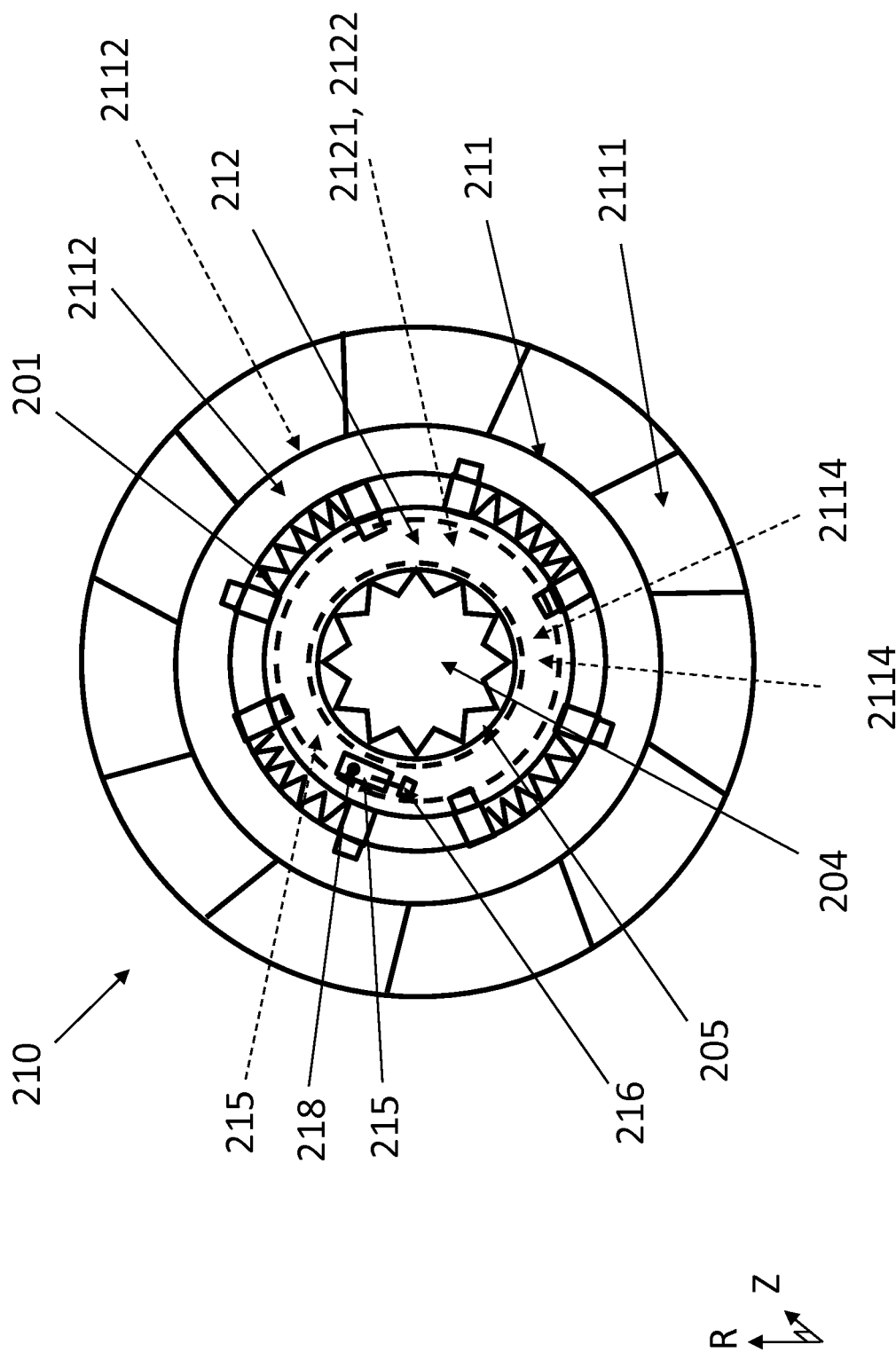
FIG. 4 schematically shows a perspective view of a torsional damper in a clutch disc arrangement, shown in any of FIGS. 5-11, according to one example of the invention.

FIGS. 3 and 4 schematically shows a perspective view of a torsional damper 210 in a clutch disc arrangement 200, as shown in any of FIGS. 5-11, according to one example of the invention. The torsional damper 210 comprises a driven plate 211, an output hub 212, intermediate friction plates 213 on either side of the driven plate 211 and a resilient member 214 arranged to press the intermediate friction plates 213 against the driven plate 211 or against the output hub 212 with a pressure force. The intermediate friction plates 213 and the resilient member 214 are rotationally fixed to the output hub 212 or the driven plate 211 forming a rotationally fixed stack 213, 214, 212; 213, 214, 211. The rotationally fixed stack 213, 214, 212; 213, 214, 211 comprises a detection friction plate 215 rotatably decoupled from the rotationally fixed stack 213, 214, 212; 213, 214, 211 and arranged in the rotationally fixed stack 213, 214, 212; 213, 214, 211.

One advantage of the invention is that the detection friction plate 215 can be arranged in the rotationally fixed stack with a pre-determined friction factor such that movement or possible movement of the detection friction plate 215 is an indication that the pressure force from the resilient member is below a pre-determined value which indicates a faulty torsional damper 210. The pre-determined friction factor is dependent on the pressure force from the resilient member and the surface characteristics of the detection friction plate 215 and the surfaces that the detection friction plate 215 bears against.

The rotationally fixed stack 213, 214, 212; 213, 214, 211 is restricted from movement in the rotational direction coinciding with the rotational direction of the driven plate 211 and the output hub 212. The rotationally fixed stack 213, 214, 212; 213, 214, 211 is however not fully restricted from movement in an axial direction Z being perpendicular to the rotational direction. The possibility to move the rotationally fixed stack 213, 214, 212; 213, 214, 211 in the axial direction allows for the resilient member 214 to directly or indirectly exert pressure on the intermediate friction plates 213 such that they can exert pressure onto the driven plate 211 or the output hub 212 depending on arrangement embodiment. It should be noted that the rotationally fixed stack 213, 214, 212; 213, 214, 211 is allowed movement in the axial direction only for a predetermined distance depending on e.g. design and available space.

With reference to FIG. 3 and according to one example embodiment, the detection friction plate 215 comprises connection means 217 for enabling rotation of the detection friction plate 215 by an external force that rotates the detection friction plate 215 when the pressure force/friction force is below a predetermined value. The connection means 217 can be any suitable connection means 217 that allows for a device (not shown) to connect to the detection friction plate 215, for example an opening, indentation, through opening, protrusion, clamping means, etc. The device comprises corresponding connection means that can connect to the connection means 217 of the detection friction plate 215 such that a force can be applied to the detection friction plate 215 for rotation/movement of the same. The device can be a torque apparatus, for example a torque wrench, set to release at a predetermined torque corresponding to a pressure force of the resilient member 214 being at or above a predetermined threshold level. A pressure force value of the resilient member 214 below the predetermined threshold level would allow for movement of the detection friction plate 215 by use of a torque below the predetermined torque indicating a faulty torsional damper 210. Hence, should the torque wrench rotate the detection friction plate 215 with a torque below the predetermined torque for release, it would be an indication that the pressure force value is below the threshold level. The torque apparatus can be an automatic/automated device connected to the detection friction plate 215 for evaluation or can be a man held device for manual evaluation. An advantage of the embodiment is an easy process for evaluation and it allows for both automatic/automated and manual evaluation. As stated before, the movement or possible movement of the detection friction plate 215 is an indication that the pressure force from the resilient member 214 is below a pre-determined value which indicates a faulty torsional damper 210, but when the detection friction plate 215 is immobilized it could be an indication that the detection friction plate 215 is stuck to the resilient member 214. Here, the torque apparatus can be used to indicate immobilisation when a predetermined torque value is exceeded without movement of the detection friction plate 215.

With reference to FIG. 4 and according to one example embodiment, the torsional damper 210 comprises a pre-loaded unit 216 connected to the detection friction plate 215. The pre-loaded unit 216 is loaded with a predetermined force that rotates the detection friction plate 215 when the pressure force is below a predetermined value. It should be noted that the pressure force together with the friction between the detection friction plate 215 and the surfaces that the detection friction plate 215 bears against determine the friction force that needs to be overcome in order to move the detection friction plate 215 with relation to the rotationally fixed stack 213, 214, 212; 213, 214, 211. Hence, by determining a threshold level for the pressure force, below which threshold level the detection friction plate 215 can be rotated/moved, the pre-loaded unit 216 can be is loaded with a predetermined force corresponding to the torque needed to rotate the detection friction plate 215. One advantage of the embodiment is that the pre-loaded unit 216 automatically rotates/moves the detection friction plate 215 when the pressure force from the resilient member 214 is below the threshold level, which allows for an easy detection of the damping performance of the torsional damper 210.

According to an example embodiment with the above described advantage, the pre-loaded unit 216 is a pre-tensioned spring connected to the detection friction plate 215 and the rotationally fixed stack 213, 214, 212; 213, 214, 211 or a unit attached to a part of the rotationally fixed stack 213, 214, 212; 213, 214, 211 or a unit fixedly arranged in connection to the rotationally fixed stack 213, 214, 212; 213, 214, 211. Here, the unit attached to a part of the rotationally fixed stack 213, 214, 212; 213, 214, 211 or a unit fixedly arranged in connection to the rotationally fixed stack 213, 214, 212; 213, 214, 211 can be any part of the torsional damper 210 to which the rotationally fixed stack is attached, all depending on design.

With reference to FIGS. 3 and 4 and according to one example embodiment, the detection friction plate 215 comprises a detection mark 218 indicating rotation of the detection friction plate 215 with relation to the rotationally fixed stack 213, 214, 212; 213, 214, 211. The detection mark 218 can be used in any one of the above described embodiments, for example together with the pre-loaded unit 216 and the torque device. One exemplary advantage with the detection mark 218 is that it enables an easy and visual detection of movement of the detection friction plate 215 relative a fixed mark. The detection mark 218 can be one or more visual indicators applied to the detection friction plate 215. According to one example, the detection mark 218 is part of the detection friction plate 215 structure, for example a notch or protrusion. According to one example, the detection mark 218 is attached to the detection friction plate 215, for example painted or glued. The fixed mark can be a one or more visual indicators on the fixed stack or unit onto which the fixed stack is attached. According to one example, the fixed mark is part of the fixed stack or unit structure, for example a notch, through opening or protrusion. According to one example, the fixed mark is attached to the fixed stack or unit, for example painted or glued. One exemplary advantage with a plurality of detection marks 218 is that it is possible to identify a progress of movement of the detection friction plate 215 should different detection marks 218 represent different distance the detection friction plate 215 has moved. In this example, different detection marks 218 have different position and could have different colours and/or shape.

FIGS. 5-11 schematically shows a clutch arrangement 200 comprising the torsional damper 210 described in connection to FIGS. 1-4. FIGS. 5-11 schematically shows that the clutch arrangement 200 comprises an engagement portion 105 connected to the crankshaft 103 of the engine 102. When the clutch 200 is engaged the engagement portion 105 bears against an outer friction surface 2111 of the driven plate 211 such that the rotational movement of the crankshaft 103 is transferred to the gearbox shaft 104 via the torsional damper 210 and the output hub 212.

As stated above, the driven plate 211 is arranged to transform rotational movement from the output shaft 103 of the engine 102, to the gearbox shaft 104, when the driven plate 211 is engaged in the clutch 200. The driven plate 211 comprises the outer friction surface 2111 arranged to be frictionally engaged with a counterpart on the crankshaft side, i.e. the engagement portion 105, in order for the driven plate 211 to be engaged in the clutch 200. The driven plate 211 is directly or indirectly attached to or part of the gearbox shaft 104. The driven plate 211 is connected to the output hub 212 which in turn is connected to the gearbox shaft 104. The driven plate 211 is rotationally balanced around a centre axis Z coinciding with the centre axis Z of the gearbox shaft 104. The driven plate 211 is advantageously disc shaped with two opposing sides 2112 extending in a radial direction R. The opposing sides 2112 can be flat or may have a curvature. The output hub 212 comprises a first side portion 2121 and a second side portion 2122 extending in the radial direction R. The driven plate 211, the intermediate friction plates 213, the resilient member 214 and the detection friction plate 215 are positioned between the first side portion 2121 and the second side portion 2122. The first side portion 2121 and the second side portion 2122 are directly or indirectly attached to or part of the gearbox shaft 104. The radial direction R is perpendicular to the centre axis Z.

Figure 5:
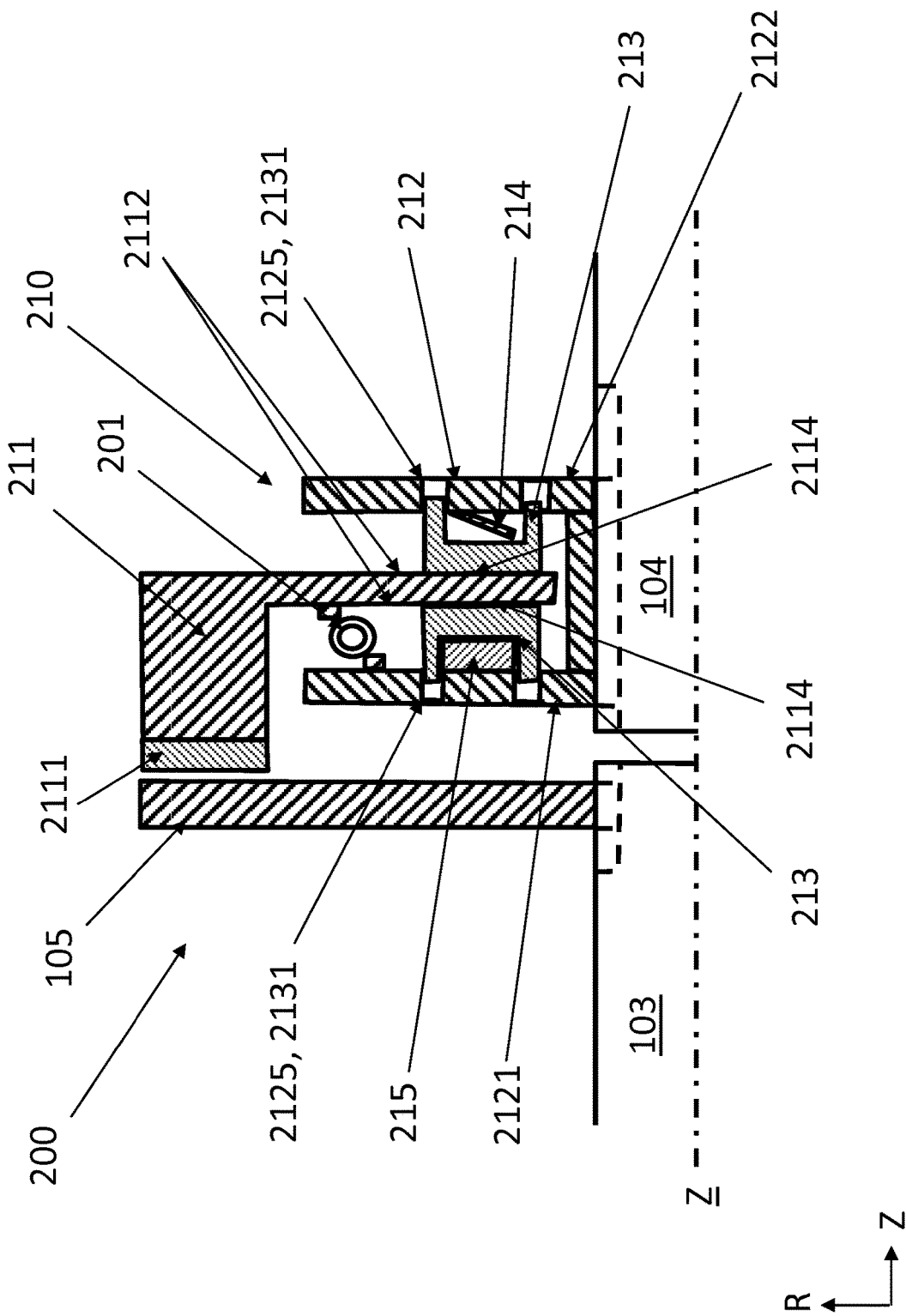
FIG. 5 schematically shows a cross-section of a clutch disc arrangement comprising a torsional damper according to one example of the invention.
Figure 6:
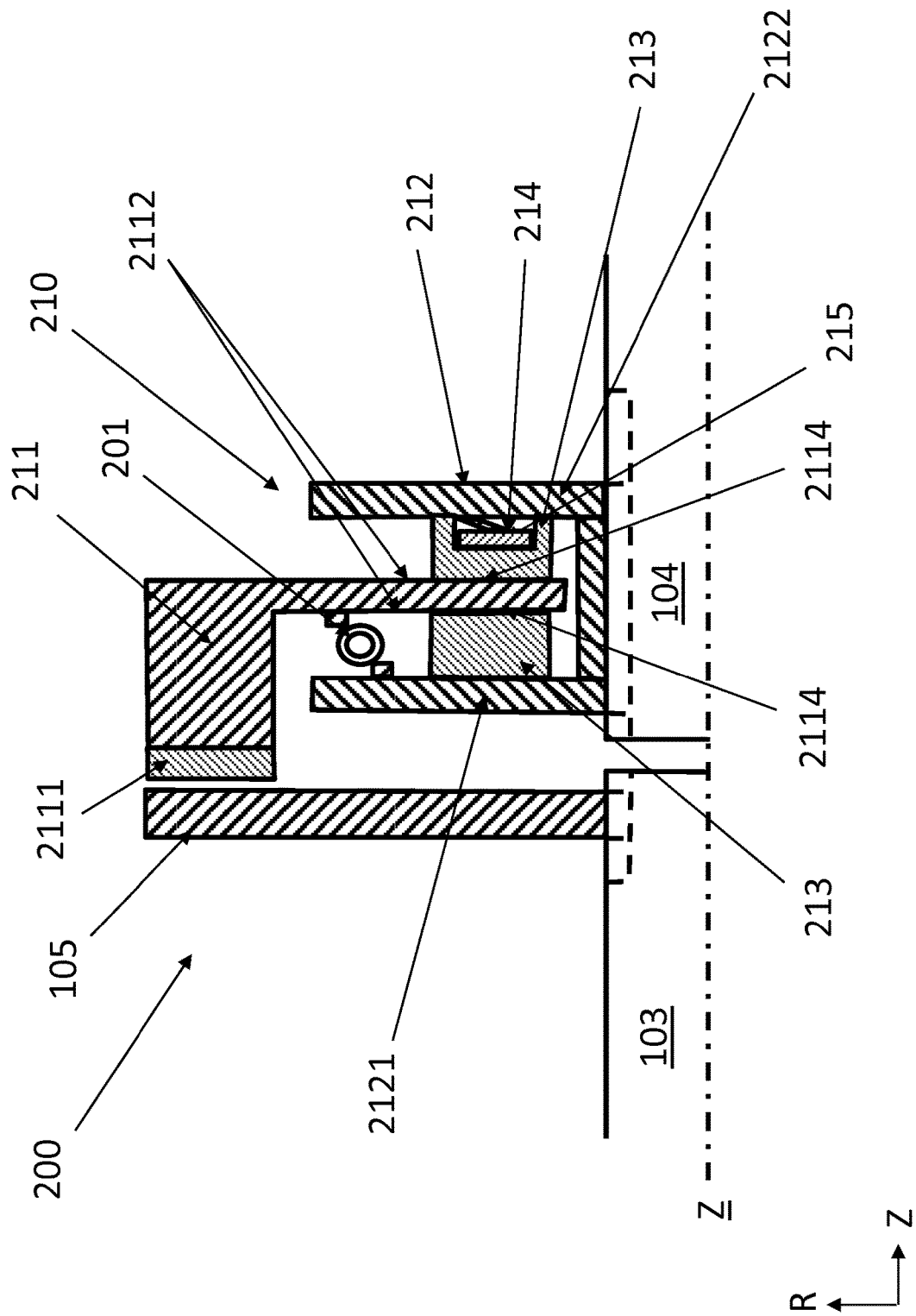
FIG. 6 schematically shows a cross-section of a clutch disc arrangement comprising a torsional damper according to one example of the invention.
Figure 7:
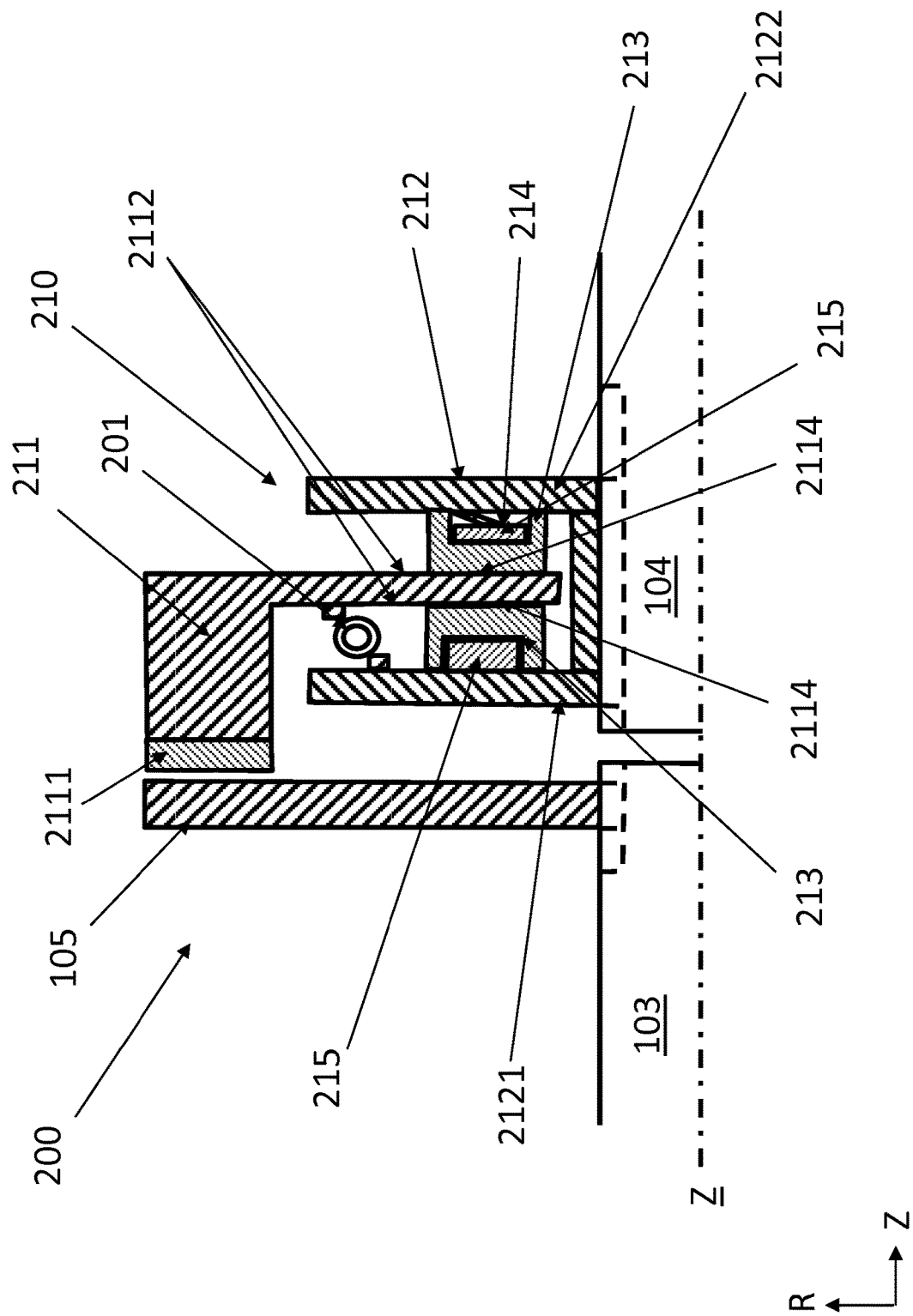
FIG. 7 schematically shows a cross-section of a clutch disc arrangement comprising a torsional damper according to one example of the invention.

FIGS. 5-7 schematically shows an embodiment where the intermediate friction plates 213 and the resilient member 214 are rotationally fixed to the output hub 212 forming the rotationally fixed stack 213, 214, 212; 213, 214, 211. The intermediate friction plates 213 are arranged to press against the driven plate 211 that is arranged to rotate relative the friction plates. Here, rotate relates to the small rotational movement allowed in clockwise and anti-clockwise direction within the torsional damper 210. The output hub 212 comprises guiding means 2125 and the intermediate friction plates 213 comprises corresponding guiding means 2131 for allowing axial movement of the intermediate friction plates 213 relative the output hub 212. The guiding means 2125, 2131 can be any suitable guiding means, for example an opening in the output hub 212 a corresponding protrusion in the intermediate friction plates 213, or vice versa. The guiding means 2125, 2131 are schematically shown only in FIG. 5, but are valid also for FIGS. 6 and 7.

When the intermediate friction plates 213 and the resilient member 214 are rotationally fixed to the output hub 212, the driven plate 211 is connected to the output hub 212 via intermediate friction plates 213 arranged on either side of the driven plate 211, i.e. at least one intermediate friction plate 213 on one side and at least another intermediate friction plate 213 on the other side of the driven plate 211. The driven plate 211 comprises an inner friction surface 2114 on each opposing side 2112 of the driven plate 211. The outer friction surface 2111 of the driven plate 211 is arranged radially R outward with respect to the inner friction surface 2114 of the driven plate 211. The resilient member 214 is arranged between the output hub 212 and one or both of the intermediate friction plates 213 in order to apply pressure on the intermediate friction plates 213 such that the intermediate friction plates 213 are pressed against the driven plate 211.

FIG. 5 schematically shows an example embodiment where the detection friction plate 215 is arranged between the output hub 212 and an intermediate friction plate 213. In FIG. 5, the resilient member 214 is arranged between the first side portion 2121 of the output hub 212 and one of the intermediate friction plates 213 to apply pressure on the intermediate friction plates 213 such that the intermediate friction plates 213 are pressed against the driven plate 211. According to one example (not shown), the resilient member 214 comprises two resilient units, wherein one resilient unit being arranged between the first side portion of the output hub and one of the intermediate friction plates, and wherein one resilient unit being arranged between the second side portion of the output hub and one of the intermediate friction plates, to apply pressure on the intermediate friction plates such that the intermediate friction plates are pressed against the driven plate.

When the intermediate friction plates 213 and the resilient member 214 are rotationally fixed to the output hub 212, the detection friction plate 215 can be positioned at various positions.

According to one example, not shown, the detection friction plate 215 is arranged between two intermediate friction plates 213 with the previously stated example advantage.

FIG. 6 schematically shows an example embodiment where the detection friction plate 215 is arranged between the resilient member 214 and an intermediate friction plate 213. In FIG. 6, the resilient member 214 is arranged between the detection friction plate 215 and the second side portion 2122 of the output hub 212. According to one example embodiment (not shown), the detection friction plate 215 is arranged between the resilient member 214 and the output hub 212. When the detection friction plate 215 is arranged in connection to the resilient member 214, the previously stated example advantage applies also here but a further advantage is that the detection friction plate 215 can be used to identify whether the resilient member 214 has got stuck to the detection friction plate 215. Due to vibrations and high pressure, it is known a problem where the resilient member 214 wears down the surface against which it is arranged, which has the consequence of less pressure against the intermediate friction 215 plates and thus a faulty torsional damper 210. As stated before, the movement or possible movement of the detection friction plate 215 is an indication that the pressure force from the resilient member is below a pre-determined value which indicates a faulty torsional damper 210, but when the detection friction plate 215 is immobilized it is an indication that the detection friction plate 215 is stuck to the resilient member 214.

FIG. 7 schematically shows an example embodiment of a combination of one detection friction plate 215 being arranged between the output hub 212 and an intermediate friction plate 213 as shown in FIG. 5 and another detection friction plate 215 being arranged between the resilient member 214 and an intermediate friction plate 213 according to FIG. 6.

FIGS. 8-11 schematically shows an embodiment where the intermediate friction plates 213 and the resilient member 214 are rotationally fixed to the driven plate 211 and the intermediate friction plates 213 are arranged to press against the output hub 212 that is arranged to rotate relative the friction plates. Here, rotate relates to the small rotational movement allowed in clockwise and anti-clockwise direction within the torsional damper 210. The driven plate 211 comprises guiding means 2113 and the intermediate friction plates 213 comprises corresponding guiding means 2132 for allowing axial movement of the intermediate friction plates 213 relative the driven plate 211. The guiding means 2113, 2132 can be any suitable guiding means, for example an opening in the driven plate 211 and a corresponding protrusion in the intermediate friction plates 213, or vice versa. The guiding means 2113, 2132 are schematically shown only in FIG. 8, but are valid also for FIGS. 9-11.

When the intermediate friction plates 213 and the resilient member 214 are rotationally fixed to the driven plate 211, the driven plate 211 is connected to the output hub 212 via intermediate friction plates 213 arranged on either side of the driven plate 211, i.e. at least one intermediate friction plate 213 on one side and at least another intermediate friction plate 213 on the other side of the driven plate 211. The output hub 212 comprises an inner friction surface 2123 on an inner side of the first side portion 2121 of the output hub 212 and an inner friction surface 2124 on an inner side of the second side portion 2122 of the output hub 212. The outer friction surface 2111 of the driven plate 211 is arranged radially R outward with respect to the inner friction surfaces 2123, 2124 of the output hub 212. In FIGS. 8-11, the resilient member 214 is arranged between the driven plate 211 and one of the intermediate friction plates 213 to apply pressure on the intermediate friction plates 213 such that the intermediate friction plates 213 are pressed against the output hub 212. According to one example (not shown), the resilient member 214 comprises two resilient units. One resilient unit being arranged in connection to one of the opposing sides of the driven plate and between the opposing side and one intermediate friction plate, wherein the other resilient unit being arranged in connection to the other of the opposing sides of the driven plate and between the opposing side and one intermediate friction plate.

When the intermediate friction plates 213 and the resilient member 214 are rotationally fixed to the driven plate 211, the detection friction plate 215 can be positioned at various positions.

Figure 8:
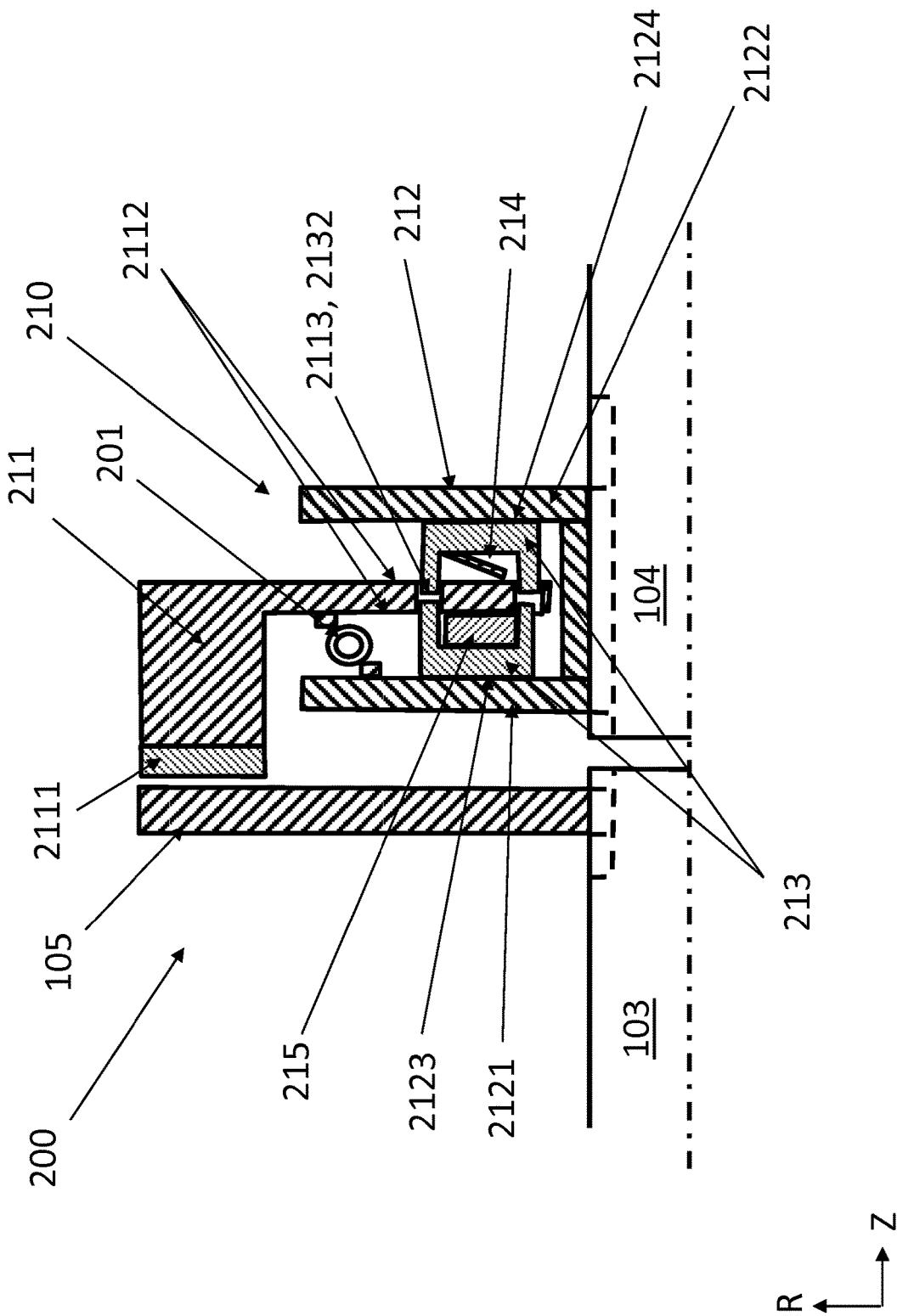
FIG. 8 schematically shows a cross-section of a clutch disc arrangement comprising a torsional damper according to one example of the invention.

FIG. 8 schematically shows an example where the detection friction plate 215 is arranged between the driven plate 211 and an intermediate friction plate 213.

According to one example, not shown, the detection friction plate 215 is arranged between two intermediate friction plates 213.

Figure 9:
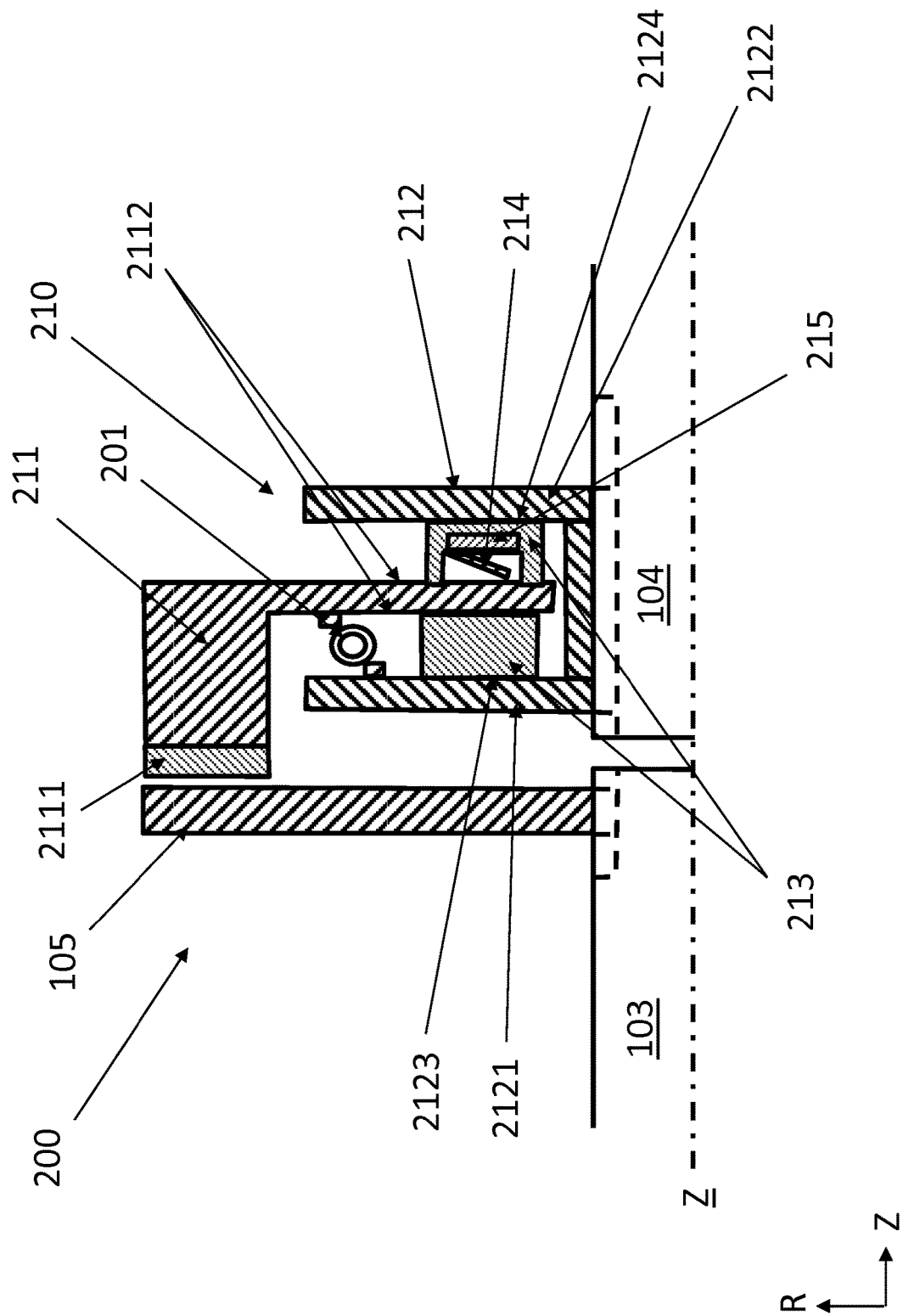
FIG. 9 schematically shows a cross-section of a clutch disc arrangement comprising a torsional damper according to one example of the invention.

FIG. 9 shows an example where the detection friction plate 215 is arranged between the resilient member 214 and an intermediate friction plate 213.

Figure 10:
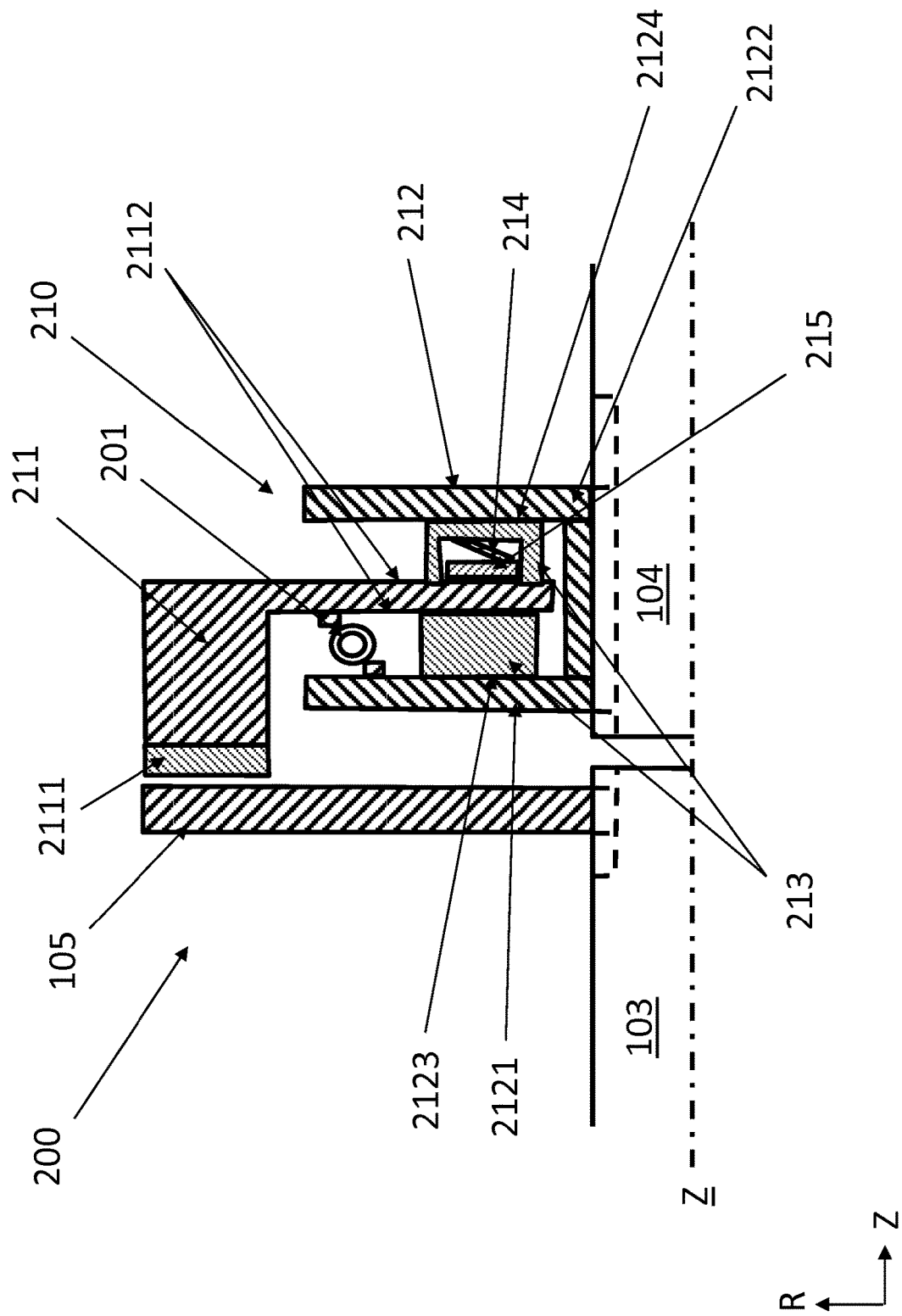

FIG. 10 shows an example where the detection friction plate 215 is arranged between the resilient member 214 and the driven plate 211.

When the detection friction plate 215 is arranged in connection to the resilient member 214, the previously stated example advantage applies also here but a further advantage is that the detection friction plate 215 can be used to identify whether the resilient member has got stuck to the detection friction plate 215. Due to vibrations and high pressure, it is known a problem where the resilient member 214 wears down the surface against which it is arranged, which has the consequence of less pressure against the intermediate friction plates 213 and thus a faulty torsional damper 210. As stated before, the movement or possible movement of the detection friction plate 215 is an indication that the pressure force from the resilient member 214 is below a pre-determined value which indicates a faulty torsional damper 210, but when the detection friction plate 215 is immobilized it is an indication that the detection friction plate 215 is stuck to the resilient member 214.

Figure 11:
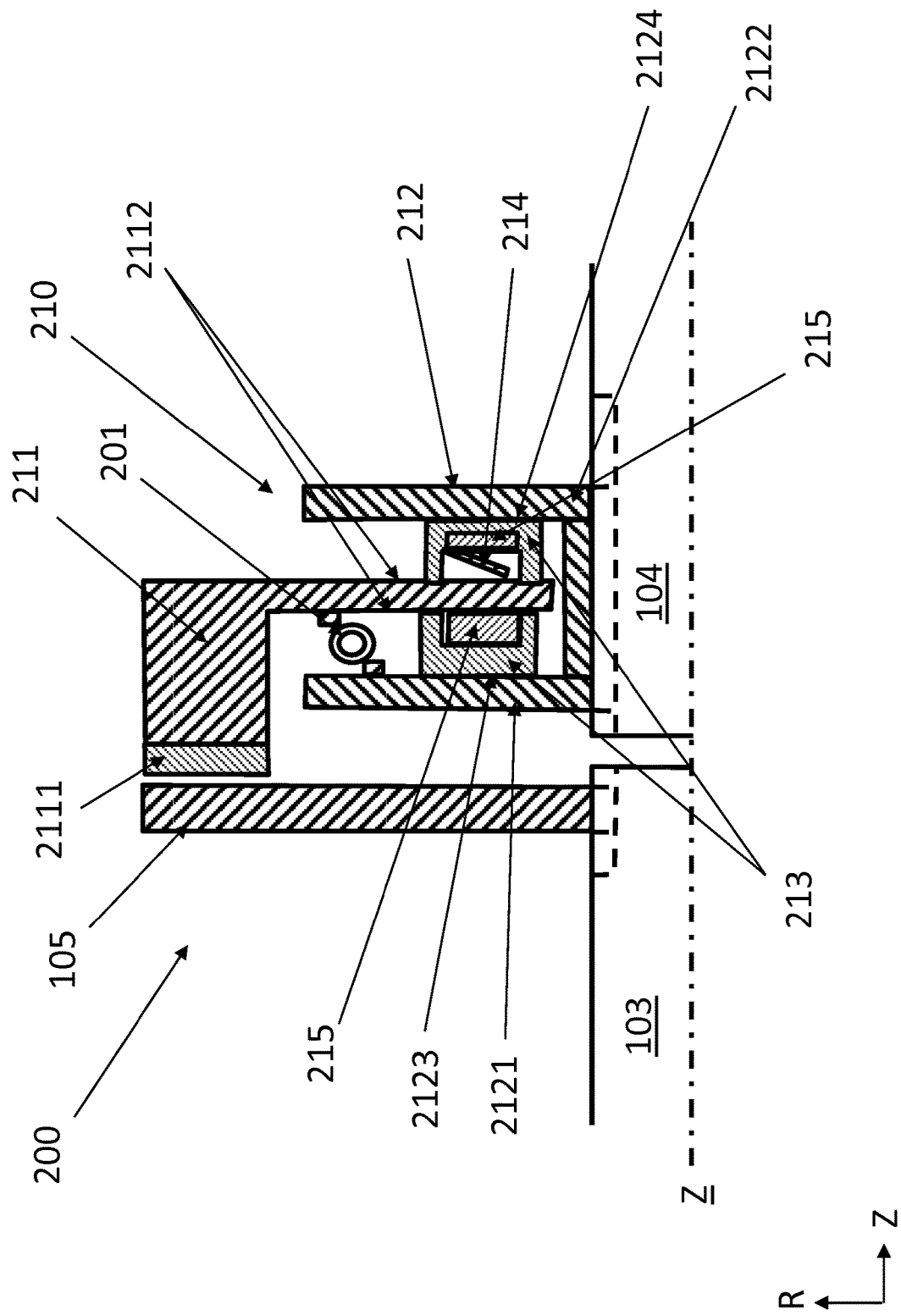
FIG. 11 schematically shows a cross-section of a clutch disc arrangement comprising a torsional damper according to one example of the invention.

FIG. 11 schematically shows an example embodiment of a combination of one detection friction plate 215 is arranged between the driven plate 211 and an intermediate friction plate 213 as shown in FIG. 8 and another the detection friction plate 215 is arranged between the resilient member 214 and an intermediate friction plate 213 according to FIG. 9.

As stated above, the detection friction plate 215 is arranged in the rotationally fixed stack 213, 214, 212; 213, 214, 211 such that it is subject to pressure, directly or indirectly, from the resilient member 214 and since the detection friction plate 215 is rotatably decoupled from the rotationally fixed stack, rotation of the detection friction plate 215 is advantageously used as indication of the state of the resilient member 214 and consequently the damping performance of the torsional damper 210.

With reference to the above described embodiments and examples, the torsional damper 210 comprises a coil spring arrangement 201 connecting the driven plate 211 and the output hub 212 and configured to enable a limited degree of rotation, clockwise and anti-clockwise, between the driven plate 211 and output hub 212.

It should be noted that all of the above described embodiments and examples relates to a torsional damper 210 in a clutch disc arrangement 200 that could be arranged to connect and disconnect a crankshaft 103 of an engine 102 to a gearbox shaft 104. Hence, the invention relates to a clutch disc arrangement 200 comprising a torsional damper 210 according to the above and a vehicle comprising such torsional damper 210 and clutch disc arrangement 200.

It is to be understood that the present invention is not limited to the embodiments described above and illustrated in the drawings; rather, the skilled person will recognize that many changes and modifications may be made within the scope of the appended claims.

The invention claimed is:

1. A torsional damper in a clutch disc arrangement configured to indicate damping performance of the torsional damper, the torsional damper comprising:
    a driven plate;
    an output hub;
    intermediate friction plates arranged on either side of the driven plate; and
    a resilient member configured to press the intermediate friction plates against the driven plate or against the output hub with a pressure force, wherein:
        the intermediate friction plates and the resilient member are rotationally fixed to the output hub or the driven plate forming a rotationally fixed stack; and
        the rotationally fixed stack comprises a detection friction plate rotatably decoupled from the rotationally fixed stack and arranged in the rotationally fixed stack.

2. The torsional damper of claim 1, wherein the torsional damper comprises a pre-loaded unit connected to the detection friction plate, wherein the pre-loaded unit is loaded with a predetermined force that rotates the detection friction plate when the pressure force is below a predetermined value.

3. The torsional damper of claim 2, wherein the pre-loaded unit is a pre-tensioned spring connected to the detection friction plate and the rotationally fixed stack or a unit attached to a part of the rotationally fixed stack or a unit fixedly arranged in connection to the rotationally fixed stack.

4. The torsional damper of claim 1, wherein the detection friction plate comprises a connection configured to enable means rotation of the detection friction plate by an external force that rotates the detection friction plate when the pressure force is below a predetermined value.

5. The torsional damper of claim 1, wherein the detection friction plate comprises a detection mark indicating rotation of the detection friction plate with relation to the rotationally fixed stack.

6. The torsional damper of claim 1, wherein the intermediate friction plates and the resilient member are rotationally fixed to the output hub forming a rotationally fixed stack.

7. The torsional damper of claim 6, wherein the detection friction plate is arranged between the output hub and an intermediate friction plate.

8. The torsional damper of claim 6, wherein the detection friction plate is arranged between two intermediate friction plates.

9. The torsional damper of claim 6, wherein the detection friction plate is arranged between the resilient member and an intermediate friction plate.

10. The torsional damper of claim 6, wherein the detection friction plate is arranged between the resilient member and the output hub.

11. The torsional damper of claim 1, wherein the intermediate friction plates and the resilient member are rotationally fixed to the driven plate forming the rotationally fixed stack.

12. The torsional damper of claim 11, wherein the detection friction plate is arranged between the driven plate and an intermediate friction plate.

13. The torsional damper of claim 11, wherein the detection friction plate is arranged between two intermediate friction plates.

14. The torsional damper of claim 11, wherein the detection friction plate is arranged between the resilient member and an intermediate friction plate.

15. The torsional damper of claim 11, wherein the detection friction plate is arranged between the resilient member and the driven plate.

16. The torsional damper of claim 1, wherein the clutch disc arrangement is configured to connect and disconnect a crankshaft of an engine to a gearbox shaft.

17. The torsional damper of claim 1, wherein the torsional damper comprises a coil spring arrangement connecting the driven plate and the output hub and configured to enable a limited degree of rotation between the driven plate and output hub.

18. A clutch disc arrangement comprising a torsional damper, the torsional damper comprising:
    a driven plate;
    an output hub;
    intermediate friction plates arranged on either side of the driven plate; and
    a resilient member configured to press the intermediate friction plates against the driven plate or against the output hub with a pressure force, wherein:
        the intermediate friction plates and the resilient member are rotationally fixed to the output hub or the driven plate forming a rotationally fixed stack; and
        the rotationally fixed stack comprises a detection friction plate rotatably decoupled from the rotationally fixed stack and arranged in the rotationally fixed stack.

19. A vehicle comprising a torsional damper, the torsional damper comprising:
    a driven plate;
    an output hub;
    intermediate friction plates arranged on either side of the driven plate; and
    a resilient member configured to press the intermediate friction plates against the driven plate or against the output hub with a pressure force, wherein:
        the intermediate friction plates and the resilient member are rotationally fixed to the output hub or the driven plate forming a rotationally fixed stack; and
        the rotationally fixed stack comprises a detection friction plate rotatably decoupled from the rotationally fixed stack and arranged in the rotationally fixed stack.

* * * * *